(No Model.)
A. COTTRAU.
CAR WHEEL.
No. 266,776. Patented Oct. 31, 1882.
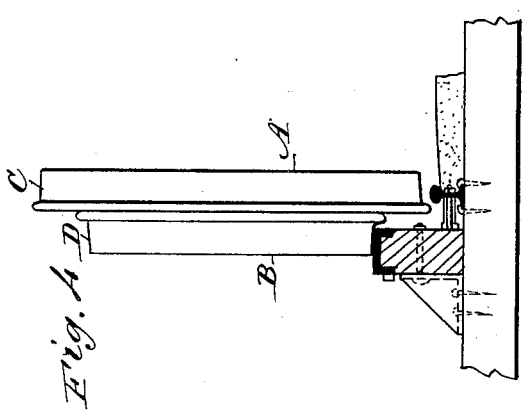
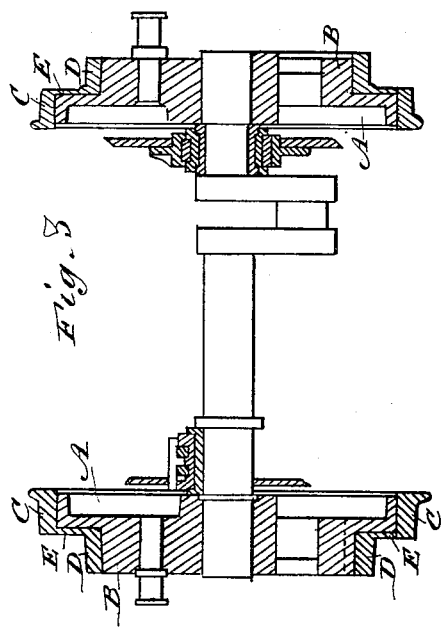
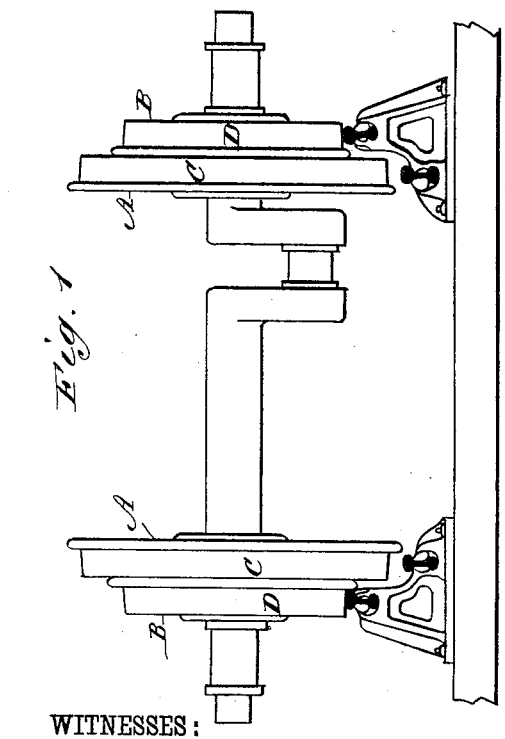
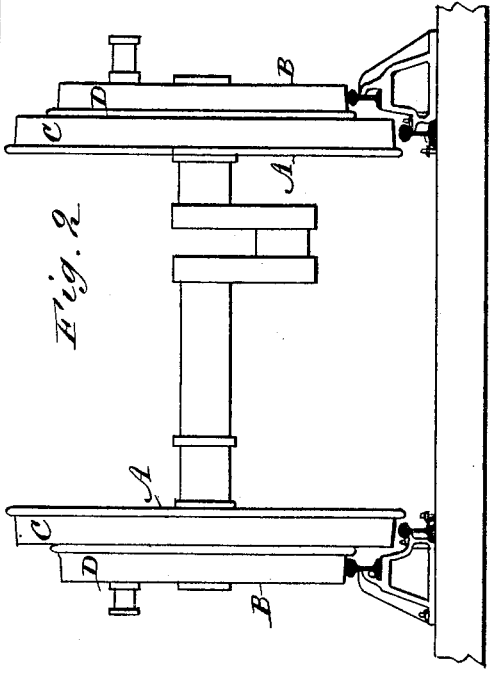
WITNESSES:
C. Neveux
C. Sedgwick
INVENTOR:
A. Cottrau
BY Munn & Co
ATTORNEYS.

UNITED STATES PATENT OFFICE.

ALFREDO COTTRAU, OF NAPLES, ITALY.

CAR-WHEEL.

SPECIFICATION forming part of Letters Patent No. 266,776, dated October 31, 1882.

Application filed May 22, 1882. (No model.) Patented in Italy January 14, 1882, No. 13,763; in England March 7, 1882, No. 1,084; in Belgium March 15, 1882, No. 57,265, and in France May 15, 1882, No. 147,741.

*To all whom it may concern:*

Be it known that I, ALFREDO COTTRAU, of Naples, Italy, have invented new and Improved Double-Tire Railroad-Wheels, of which the following is a full, clear, and exact description.

The object of my invention is to provide new and improved strong and durable wheels for running on roads with double tracks.

The invention consists in two concentric tires fitting over the treads and connected at the adjoining edges by a flat ring which is placed edgewise in relation to the tires.

Reference is to be had to the accompanying drawings, forming part of this specification, in which similar letters of reference indicate corresponding parts in all the figures.

Figure 1 is a longitudinal elevation of a locomotive-axle on which two of my improved wheels are mounted, the axle being provided with external journals. Fig. 2 is a longitudinal elevation of a locomotive-axle on which two of my improved wheels are mounted, the axle being provided with internal journals. Fig. 3 is a like view, showing the wheels in section. Fig. 4 is an elevation of the edge of the wheel.

Two wheels, A and B—one of smaller and the other of larger diameter—are cast or forged together, so as to form one integral mass, the smaller wheel being to the outside. The two tires C and D are also made of one piece, and are shrunk on the double wheel A B in the usual manner. The two tires are connected at their adjoining edges by a flat ring portion, E, resting against the outer surface of the larger wheel, as shown in Fig. 3. These wheels can be used as locomotive-wheels or as wheels for the cars, as may be desired, and may be made solid or with spokes. They are to be used on roads having two sets of tracks, on the inner set of which the large tires run when the train is on a level and is to run very fast, and when the train is to run up an incline and great power is desired the small tires run on the outer rails. Heretofore I have mounted two separate wheels on each end of the axle; but I prefer to use the double-tire wheel described above. As shown, the journals of the axle can be to the inside or outside of the wheels.

Having thus fully described my invention, I claim as new and desire to secure by Letters Patent—

1. The combination, with a railway-wheel provided with two concentric treads, of two concentric tires made integral and surrounding the treads of the wheels, substantially as herein shown and described, and for the purpose set forth.

2. The combination, with the wheel A B, provided with two concentric treads, of the concentric tires C D, fitting on the treads of the wheel A B, and united by a flat ring portion, E, placed edgewise in relation to the two tires, substantially as herein shown and described, and for the purpose set forth.

ALFREDO COTTRAU.

Witnesses:
 ING LORENZO RAIMONDA,
 FELICE BAZETTO.